(12) United States Patent
Canning et al.

(10) Patent No.: US 8,276,184 B2
(45) Date of Patent: Sep. 25, 2012

(54) USER-CENTRIC RESOURCE ARCHITECTURE

(75) Inventors: Simon G. Canning, Ferny Grove (AU); Peter J. K. Tuton, Shailer Park (AU)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 12/186,254

(22) Filed: Aug. 5, 2008

(65) Prior Publication Data
US 2010/0037304 A1    Feb. 11, 2010

(51) Int. Cl.
*G06F 21/00* (2006.01)
*H04L 29/06* (2006.01)

(52) U.S. Cl. .................................. 726/1; 726/4; 726/17

(58) Field of Classification Search .................. 726/1, 2, 726/3, 4, 16, 17, 21, 28, 29, 27; 713/182, 713/183, 168
See application file for complete search history.

(56) References Cited

U.S. PATENT DOCUMENTS

| | | | |
|---|---|---|---|
| 2004/0073668 A1* | 4/2004 | Bhat et al. | 709/225 |
| 2005/0166260 A1 | 7/2005 | Betts et al. | |
| 2006/0041666 A1 | 2/2006 | Karremans | |
| 2007/0234402 A1* | 10/2007 | Khosravi et al. | 726/2 |
| 2008/0120264 A1* | 5/2008 | Lee et al. | 706/47 |
| 2009/0287627 A1* | 11/2009 | Van Elburg | 706/47 |

FOREIGN PATENT DOCUMENTS

EP    1508999    2/2005

* cited by examiner

*Primary Examiner* — Gilberto Barron, Jr.
*Assistant Examiner* — Izunna Okeke
(74) *Attorney, Agent, or Firm* — DeLizio Gilliam, PLLC (57) ABSTRACT

Some embodiments include a computer-implemented method for controlling access to resources of a platform in a computer system. The method can comprise detecting a request to access a resource, wherein the resource resides in the computer system, and wherein the resource is associated with an owner; requesting a first resource access decision from a first policy decision unit associated with the owner; receiving, from the first policy decision unit, the first resource access decision and first trust information, wherein the first trust information indicates trust of a second policy decision unit; requesting a second resource access decision from the second policy decision unit associated with the virtual universe platform; receiving, from the second policy decision unit, a second resource access decision; and returning the second resource access decision.

25 Claims, 6 Drawing Sheets

USER-CENTRIC RESOURCE ARCHITECTURE

BACKGROUND

Embodiments of the inventive subject matter generally relate to the field of network security, and more particularly, to techniques for user-centric policy architectures.

Administrators typically use policies to control a user's ability to access one or more resources on a platform. In existing policy architectures, platform owners manage and administer resource policy decisions. As a result, resource owners have little or no control over policy decisions affecting to their resources, and they may not have the ability to control who accesses or modifies their resources.

SUMMARY

Some embodiments include a computer-implemented method for controlling access to resources of a platform in a computer system. The method can comprise detecting a request to access a resource, wherein the resource resides in the computer system, and wherein the resource is associated with an owner; requesting a first resource access decision from a first policy decision unit associated with the owner; receiving, from the first policy decision unit, the first resource access decision and first trust information, wherein the first trust information indicates trust of a second policy decision unit; requesting a second resource access decision from the second policy decision unit associated with the virtual universe platform; receiving, from the second policy decision unit, a second resource access decision; and returning the second resource access decision.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Introduction

Figure 1:
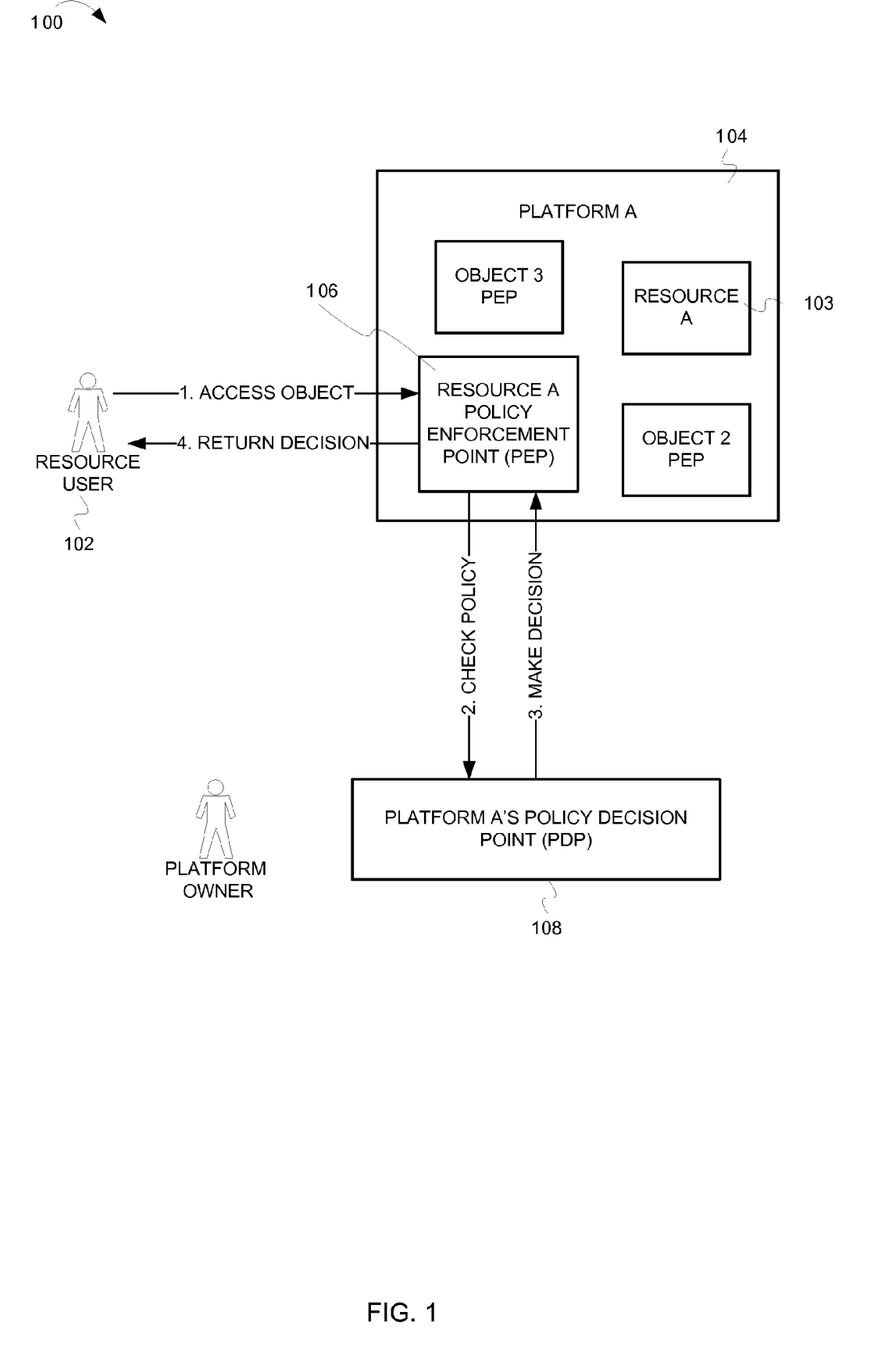
FIG. 1 is a data flow diagram illustrating operations for determining and enforcing resource access permissions in typical policy architectures.

Administrators typically use policies to control a user's ability to access one or more resources on a platform. A platform can be any suitable hardware or software framework on which resources can be stored and software applications can be run. Example platforms include operating systems, virtual world systems, programming languages, websites, etc. Policies can include rules that can be used to control access to or manage a set of resources. Policies are typically stored in one or more policy decision units (PDUs). These PDUs are responsible for determining, depending on the policy, whether a user is authorized to access a particular resource. Some policy architectures are built so that policy decisions for accessing resources are made by the facilitator of the resource (e.g., the platform administrator). In other words, a policy decision unit (PDU) may be owned and administered by a platform. A policy decision unit may include instructions on a machine-readable media and hardware, and may be a part of a virtual universe, operating system, website, etc. Additionally, in some policy architectures, there typically exists one or more policy enforcement units (PEU) that communicate with a PDU. PEUs can perform operations to enforce a policy decision (e.g., grant or deny resource access) made by the PDU. FIG. 1 is a data flow diagram illustrating operations for determining and enforcing resource access permissions in policy architecture.

The data flow diagram 100 depicts a platform A 104 including a plurality of objects. The objects can reside on the platform and may be distinct from one another. The objects can be resources including video, audio, data files, etc. In virtual world applications, objects can be in the form of islands, buildings, data, and any other entities created by a user (avatar). Each object (or resource) 103 is associated with a policy enforcement unit (PEU). In some instances, the PEU can be a part of the resource, while in other instances, the PEU may reside separately from the resource (as shown in FIG. 1). The PEU is responsible for communicating with a policy decision unit (PDU) and enforcing the PDU's decisions. The PEU protects user access to one or more resources. The PDU may include logic (e.g., instructions executable by a machine, circuits, etc.) to evaluate the PEU's request (e.g., the PEU can send a description of the resource request to the PDU), check the request against policies, and render an authorization decision (e.g., allow or block resource access). In one embodiment, a resource user 102 requests access to a protected resource A 103 on platform A 104 (refer to step 1). In response to the request, resource A's PEU 106 communicates with platform A's policy decision unit (PDU) 108. In some embodiments, the communication is carried out by a resource facilitator, which can be a part of platform A and can include logic to facilitate communication between PEUs and PDUs. The PDU 108 can use information sent by resource A's PEU (e.g., resource user name, user id, position in the organization, resource name, resource type, etc.) and determine whether the user is authorized to access the protected resource 103 (refer to step 2). In step 3, platform A's PDU 108 communicates this decision to resource A's PEU. In step 4, the PEU 106 enforces the PDU's decision allowing or blocking user access to protected resource A. Thus, in order to access any resource on the platform 104, a resource user 102 should satisfy the set of rules prescribed by the platform's PDU 108.

Figure 2:
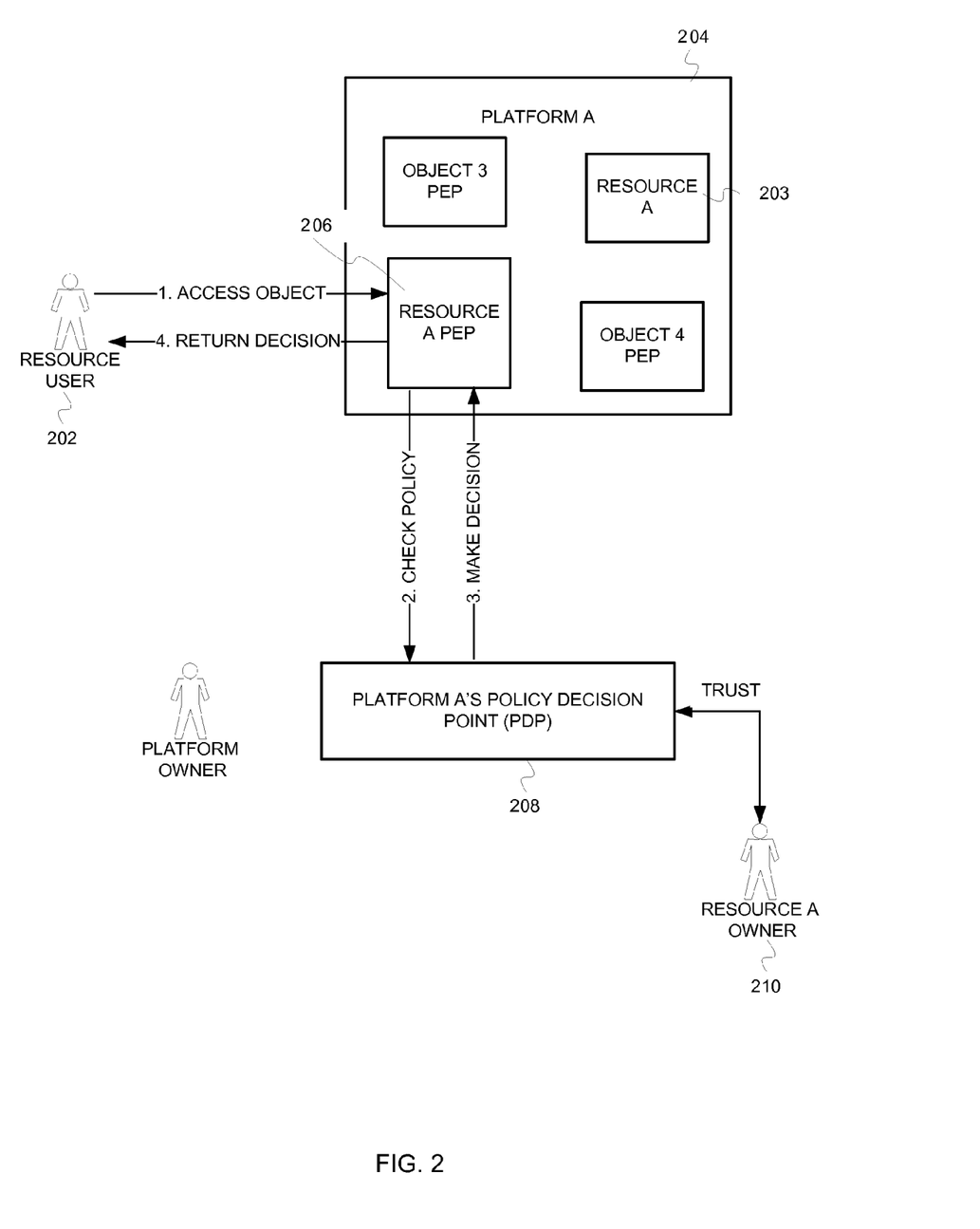
FIG. 2 is a data flow diagram illustrating the operations for granting resource access in a user-centric architecture.

In a user-centric architecture, such as a virtual world or technologies relating to Web 2.0, anything created or managed by a user (or avatar) can correspond to a resource. Some examples of virtual world resources include islands, buildings, audio files, presentations, etc. Some examples of resource access include accessing an organization's video file, teleporting between islands, entering a building with restricted access, emailing documents within the virtual world, etc. Web 2.0 resources can include any user-posted content, such as audio files, video files, documents, blogs, etc. on a website. In some instances, resource owners may want the ability to determine who accesses resources they own, control, or manage. FIG. 2 is a data flow diagram illustrating the operations for granting resource access in a user-centric architecture.

In FIG. 2, a platform A 204 includes resource A 203 and other objects (not shown). A policy decision unit (PDU) 208 is also associated with platform A, and includes rules and policies to determine a user's resource access permissions. Every resource or object on the platform is associated with a policy enforcement unit (PEU), which is responsible for enforcing policy decisions made by the PDU 208. Typically, in user centric architecture, resource owners may not have the ability to create their own policies and access rules. For example, a virtual universe may make all policy decisions about user-owned objects. Thus, creators of objects within the virtual universe (VU) may be required to create access policies using the VU's interface and infrastructure. However, creators of objects in the VU may want to create and use their own policy decision unit to enforce their access policies. As another example, if a website is the underlying platform for a resource (e.g., video file), owners of a video file may be forced to trust and comply with the website's user-access policies, and may not have the ability to create and enforce their own policies. In FIG. 2, a resource user 202 accesses a protected resource A 203 on platform A 204 (refer to step 1). Resource A 203 may interface with its associated PEU 206 and communicate with platform A's PDU 208 to request a policy check (refer to step 2). In step 3, the platform's PDU 208 determines whether the user is authorized to access the protected resource 203 and communicates this decision to resource A's PEU 206. In step 4, the PEU 206 enforces the PDU's decision by allowing or blocking user access to resource A. In FIG. 2, resource A's owner 210 trusts the platform's policy decision unit 208 to provide policy decisions. In other words, although the resource owner 210 trusts platform A, the resource owner 210 is limited to the functionality provided by the platform's policy engine. In some instances, the resource owner 210 may also have to learn about the platform's policy administration unit (PAP) and know how to administer policy using the platform's PAP.

Some embodiments allow users responsible for creating or managing resources to establish resource access rules and make decisions regarding who can access their resources. For example, users posting videos on website (e.g., YouTube) may want to restrict viewing rights to their friends. Some users may also want to provide more elaborate access control decisions (e.g., read, write, copy permissions, etc). Some embodiments of the inventive subject matter describe techniques for user-centric architectures that allow users to specify policies for user-provided resources. The following discussion describes this and other features in greater detail.

Example Architecture and Operating Environments

The following approach to policy architecture allows for user-centric policy management in line with Web 2.0, overcomes the shortfalls of having to rely on, trust, and learn third party policy architectures, and allows an object owner the ability to apply fine-grained security policies to the objects they own or manage. This solution allows resource owners to use their own PDU without relying on or trusting in a platform's PDU. This solution also allows for a single PEU to access multiple PDUs in order to evaluate policy.

Figure 3:
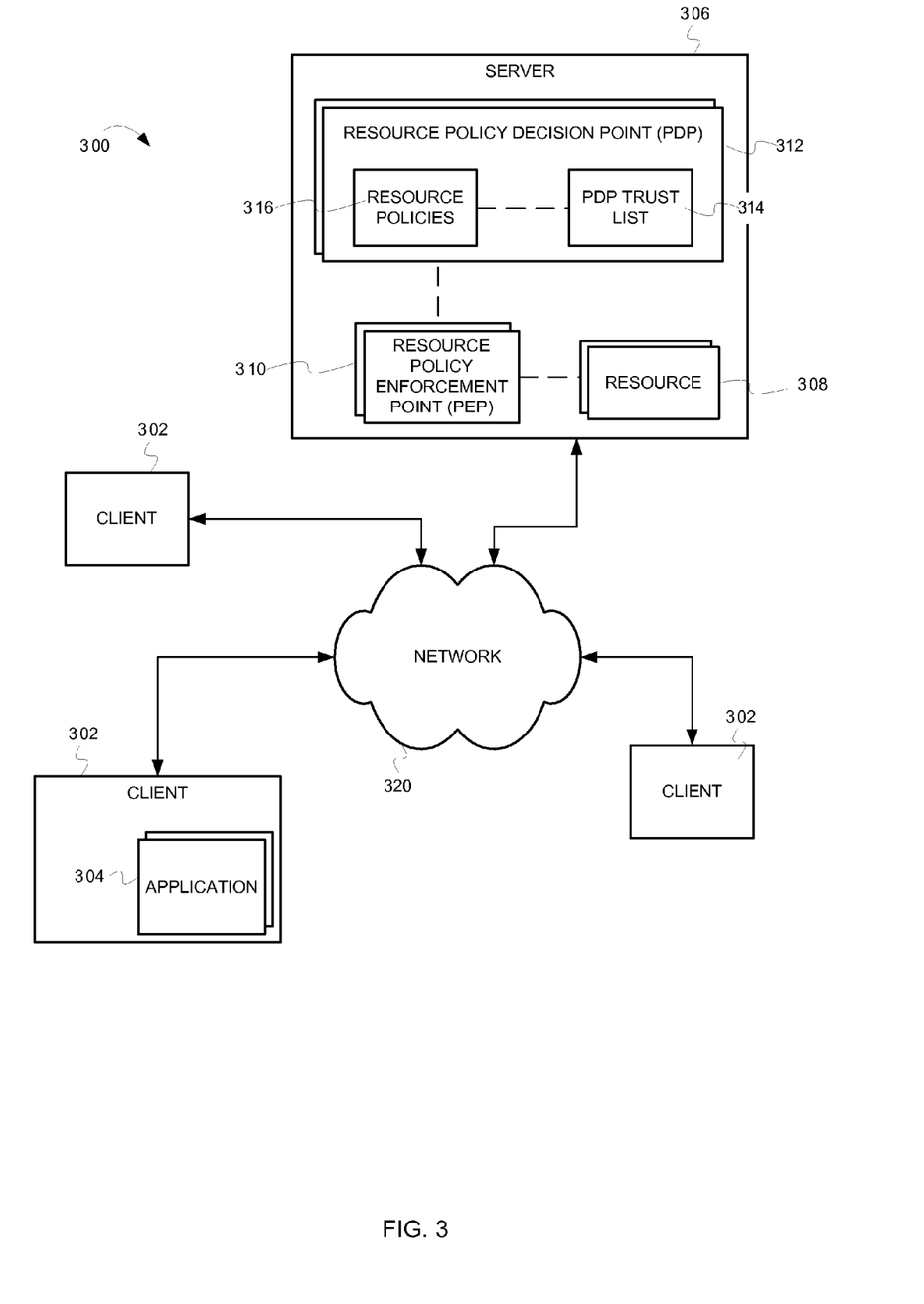
FIG. 3 is an architectural block diagram illustrating a system configured to evaluate, determine, and enforce policy decisions, according to some embodiments.

FIG. 3 is an architectural block diagram illustrating a system configured to evaluate, determine, and enforce policy decisions, according to some embodiments. The system 300 includes a server 306 and clients 302. The client 302 includes one or more applications 304. The server 306 includes one or more resources 308, resource policy enforcement units (PEU) 310 and resource policy decision units (PDU) 312. The policy decision units may include machine instructions, hardware, software, etc. and may be a part of a platform (e.g., virtual universe, operating system, website, programming language, etc). Additionally, the resource PDU 312 can also include one or more resource policies 316 and a PDU trust list 314. The PDU trust list 314 can include a list of trusted PDUs, non-trusted PDUs, and a default decision (trusted or non-trusted) for an unknown PDU. Trust can be specified at and by each resource's PDU and the list of trusted PDUs may be supplied to the PEU upon request. The PEU is responsible for the enforcement of the PDU trust list.

In some embodiments, a user can access one or more resources 308 on the server 306, via an application 304. A request to the application's resource 308 can include information identifying a user (e.g., user name) and the calling application (e.g., application name, website's Internet Protocol (IP) address, etc). The resource 308 may interface with its associated resource PEU 310. The PEU 310 can communicate with the resource's PDU 312 to request a policy decision and the PDU trust list 314 associated with the requested resource 308. The resource PEU 310 can traverse the resource hierarchy (as listed in the PDU trust list) and request authorization decisions from the trusted PDUs. The PEU 310 may stop traversing the hierarchy when the hierarchy is exhausted or a negative response is returned. In some instances, to improve performance, the PEU may also cache the responses from each of the trusted PDUs in accordance with the PDU's parameters. In some instances, if resource owners trust a parent resource's PDU, the parent resource's PDU can make the decision for them. This gives owners the ability to maintain explicit policy decisions and to trust another PDU when there is no specific policy.

In some instances, the policy decision units can use information such as a resource id, an action, and the identity of the user wishing to access the resource to make a decision regarding whether the user can perform a specific action on that particular resource. For each resource, the platform can provide the resource owner the ability to specify the location of a resource's PDU. In some instances, this can be achieved in the form of a parameter, whose value is set by the resource owner. Upon request for access to the resource, the PEU can determine the value of the parameter that specifies the location of the PDU, and request the desired access (e.g., read, write, modify, etc.) to the resource on behalf of the requesting user or system. The PDU can make a decision based on the resource owner's credentials and infrastructure, and relay the result to the resource's PEU. In some instances, if a resource's PDU is not available, the PEU may access the resource's next trusted container object PDU (as determined from the PDU trust list). This may occur for all trusted container objects until a trusted decision can be made, or there are no more trusted PDUs and an unauthorized decision is returned. In other instances, if a resource's PDU is not available, the resource's PEU may block access to the requested resource and may not contact other trusted PDUs.

In some instances, the PDU trust list can be a part of a PDU configuration file, while in other instances, the PDU trust list be in an independent file accessed by the PDU and the PEU. The example below shows a sample configuration file for a PDU trust list associated with PDU 1. PDU1 trusts PDU3, does not trust PDU2, and has a default "not trusted" setting for all other unknown PDUs.

```
<PDU>
    <Name>PDU1</Name>
    <Address>PDU.1.com</Address>
    <Trust-List>
        <Trusted>
            <PDU>
                <Name>PDU3</Name>
                <Address>PDU.3.com</Address>
                <Owner>Owner_3</Owner>
                .
                .
                .
            </PDU>
        </Trusted>
        <Non-Trusted>
            <PDU>
                <Name>PDU2</Name>
                <Address>PDU.2.com</Address>
                <Owner>Owner_2</Owner>
                .
                .
                .
            </PDU>
        </Non-Trusted>
        <Unknown>Not-Trusted</Unknown>
    </Trust-List>
</PDU>
```

The following example depicts a configuration file specifying the PDU associated with a resource. In this example, Resource 1 is owned by Owner 1 and is associated with PDU1.

```
<Resource>
    <Name>Resource1</Name>
    <Owner>Owner_1</Owner>
    <PDU>
        <Name>PDU1</Name>
        <Address>PDU.1.com</Address>
    </PDU>
</Resource>
```

In some instances, the Security Assertion Markup Language (SAML) protocol (e.g., a SAML Authorization query with the combination of XACML being utilized as the access control language) can be used to make the communication between the PEU and the PDU homogenous. In other instances, any suitable protocol and access control language combination can be used. The server 306 and the clients 302 are connected to a communication network 320. The network 320 can include any technology suitable for passing communication between the clients and servers (e.g., Ethernet, 802.11n, SONET, etc.). Moreover, the network 320 can be part of other networks, such as cellular telephone networks, public-switched telephone networks (PSTN), cable television networks, etc. Additionally, the server 306 and clients 302 can be any suitable computing devices capable of executing software in accordance with the embodiments described herein.

Example Data Flow Operations

This section describes operations associated with some embodiments of the invention. In some embodiments, the operations can be performed by logic not described in the block diagrams; furthermore, some embodiments can perform more or less than the operations shown in any flow diagram. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel.

Figure 4:
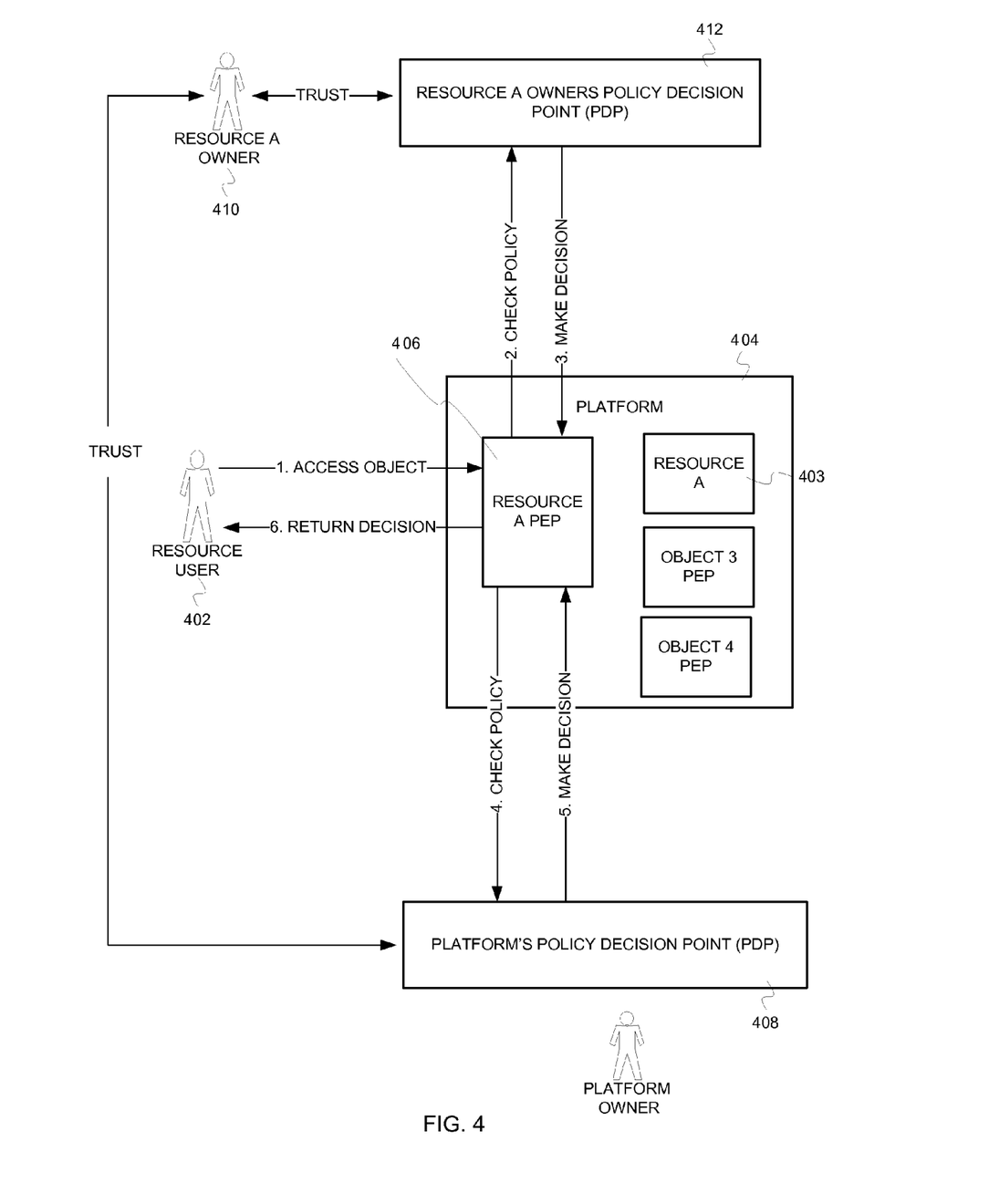
FIG. 4 is a data flow diagram illustrating operations to evaluate policy, according to some embodiments.

FIG. 4 is a data flow diagram illustrating operations to evaluate policy, according to some embodiments. In FIG. 4, a platform 404 includes resource A 403, and objects and their associated PEUs. Resource A is owned by owner A 410 and is associated with owner A's policy decision unit 412. In step 1, a resource user 402 accesses resource A. Resource A's PEU 406 accesses its policy decision unit 412 (refer to step 2). The PDU 412 determines whether the resource user 402 can access the protected resource based on owner A's policies and information about the resource user (e.g., username, intended action on resource, etc). Owner A's PDU 412 then communicates this decision to resource A's PEU 406 (refer to step 3). In some instances, along with an access decision, owner A's PDU 412 can also return a PDU trust list (not shown). The PDU trust list can indicate a list of PDUs that resource A's PEU can trust, and request policy decisions from. As shown in FIG. 4, there is a trust relationship between owner A's PDU 412 and the platform's PDU 408. Therefore, in step 4, resource A PEU 406 requests a policy decision from the platform's PDU 408. The platform's PDU can use its own policies (defined by the platform owner) and information provided by the PEU (e.g., user information, resource information, etc.), and return a policy decision to resource A's PEU (refer to step 5). In step 6, resource A's PEU 406 enforces the policy decision by granting or blocking user access to resource A 403. If resource A's owner 410 does not trust the platform's PDU 408, resource A's PEU 406 does not request an access decision from the platform's PDU (i.e. steps 4 and 5 do not take place).

This method and policy architecture allows resource owners to use their own policy infrastructure to make policy decisions. This user-centric policy architecture could be used when a resource is created on a 3rd party resource facility, when the original creator of the resource wishes to maintain control and apply specific policy to the object, and when resource owners do not or cannot rely on the underlying 3rd party's policy architecture. For example, on an organization's island (within the virtual world), an employee may create an object (e.g., a technical presentation) within the island and may restrict the object's usage to other employees within the organization and on the island. The object creator could design a PDU to interface with an employee database, determine whether an avatar is an employee, and therefore allow access to the objects on the island. Additionally, this method may also be applied to resources, which are part of another resource or reside within another resource. In some instances, a resource may also have the ability to trust one or more policy decision units. The resource can use an open standard (e.g., eXtensible Access Control Markup Language (XACML)) to communicate with policy decision units. This is further illustrated in FIG. 5.

Figure 5:
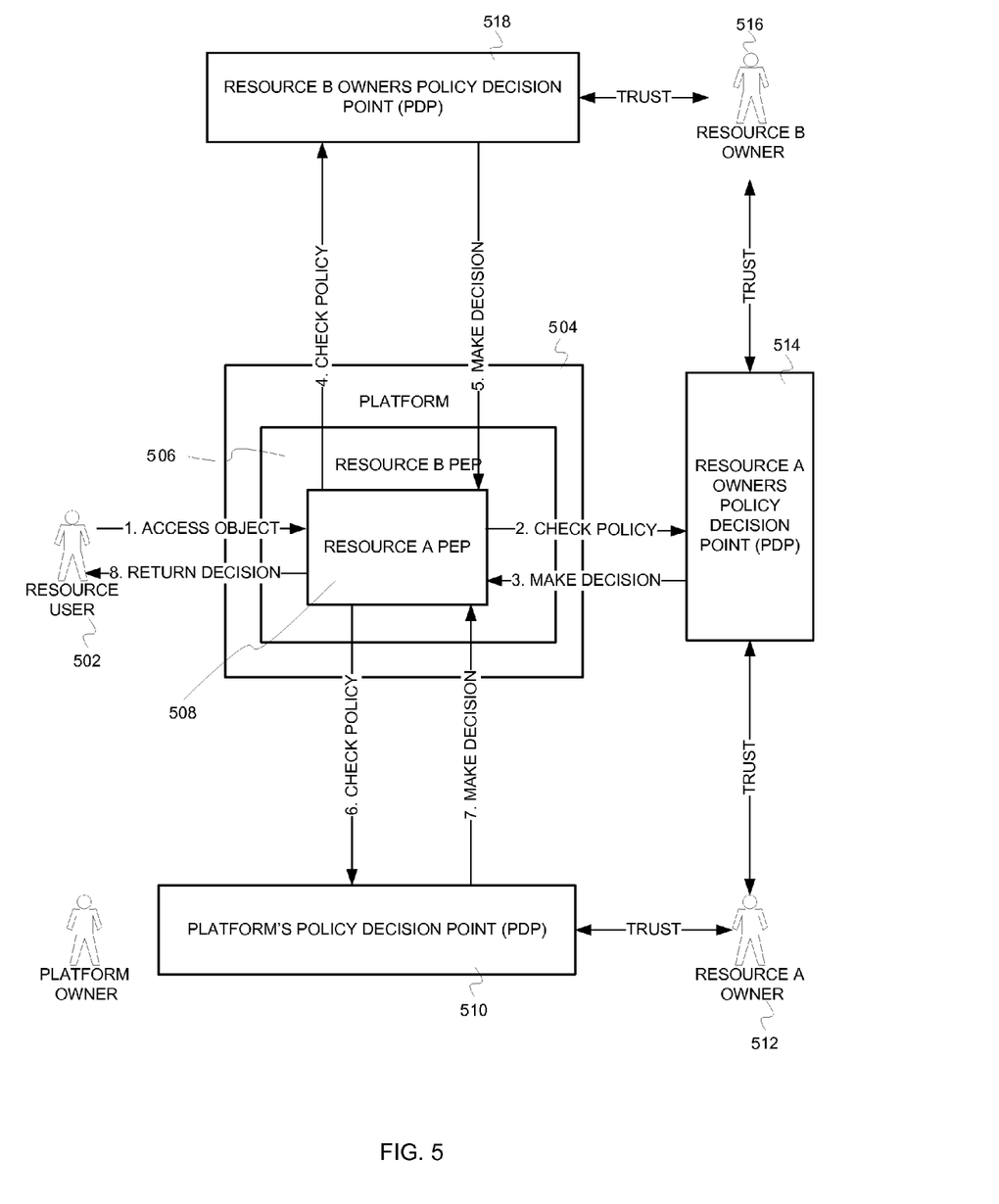
FIG. 5 is a data flow diagram illustrating policy evaluation using multiple hierarchical PDUs, according to some embodiments.

FIG. 5 is a data flow diagram illustrating policy evaluation using multiple hierarchical PDUs, according to some embodiments. In FIG. 5, the platform 504 includes resources (not shown) and resource A PEU (508) nested within resource B PEU (506). In step 1, a user 502 accesses resource A, owned by owner A 512, and associated with a policy decision unit 514. Resource A's PEU 508 accesses its policy decision unit 514 (refer to step 2) and requests a policy decision. Owner A's PDU 514 makes a decision regarding whether the resource user 502 can access resource A based on owner A's policies and information about the resource user. Owner A's PDU 514 then communicates this decision to resource A's PEU 508 (refer to step 3). Additionally, resource A PEU 508 may also request a trust list (not shown) from its PDU 514 and receive this trust list along with the policy decision. Resource A's PEU 508 can use this trust list to determine that owner A's PDU 514 trusts owner B's PDU 518 and the platform's PDU 510. Therefore, at step 4, resource A's PEP 508 requests a policy decision from owner B's PDU, while at step 5, resource B's PDU makes, and returns a resource authorization decision. Similarly, at steps 6 and 7, resource A's PEU 508 requests and receives (respectively) a resource access decision from the platform's PDU 5 10. In step 8, resource A's PEU 508 enforces the policy decision by granting or blocking user access to resource A. If resource A's owner 512 does not trust the platform, it does not request a policy decision from the platform's PDU (i.e., steps 6 and 7 are not performed). Similarly, steps 4 and 5 are not executed if resource A's owner 512 does not trust owner B's PDU 518.

Figure 6:
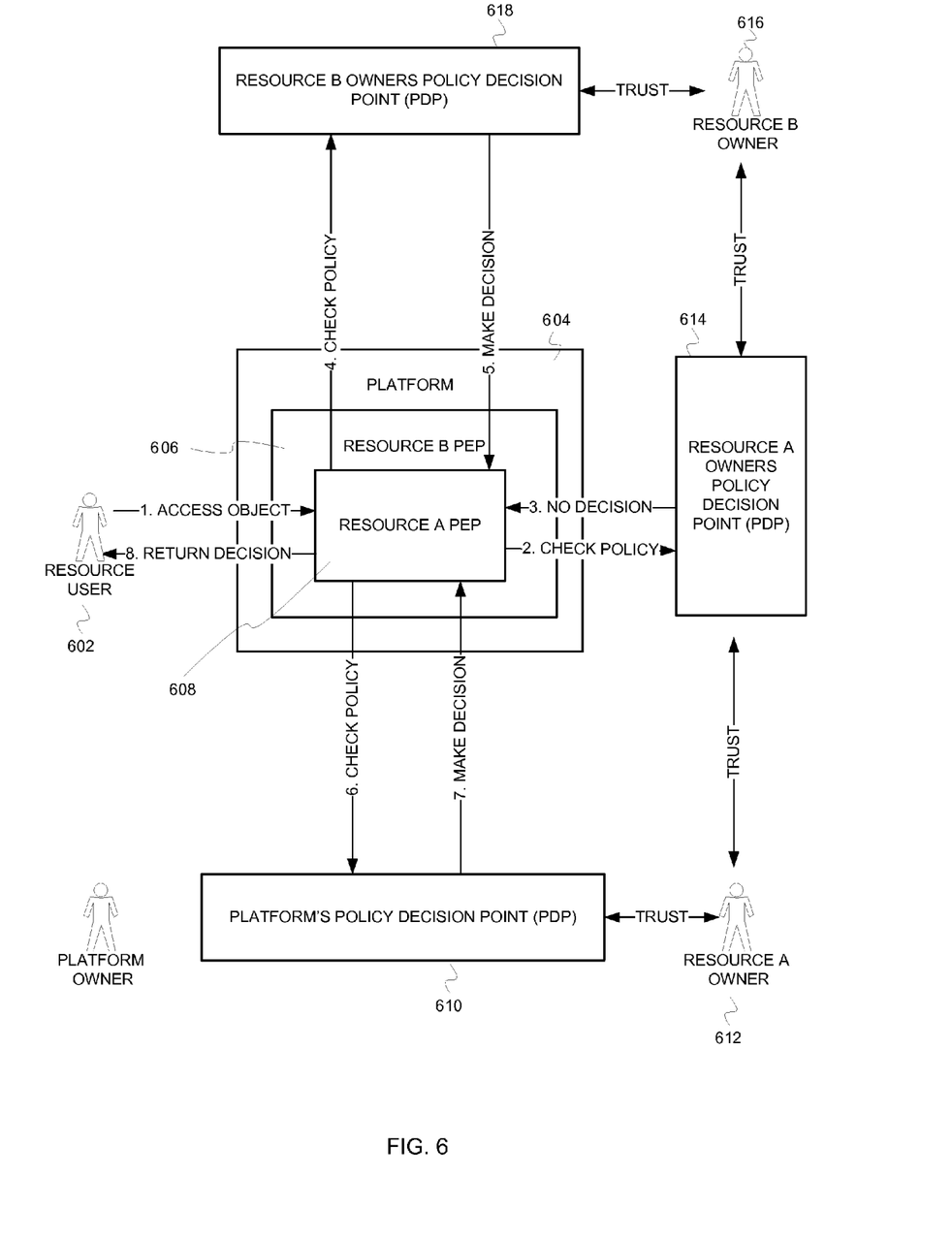
FIG. 6 is a data flow diagram illustrating policy evaluation using alternate trusted PDUs, when a resource PDU is unavailable, according to some embodiments.

In the event that a resource's PDU is not available, an alternate PDU, trusted by the requested resource's owner, may be used to render a policy decision. This is illustrated in FIG. 6. In FIG. 6, a platform 604 includes resources (not shown) and resource A PEU (608) nested within resource B PEU (606). In FIG. 6, a resource user 602 accesses resource A (refer to step 1). Resource A's PEU 608 interfaces with owner A's policy decision unit 614 to request a decision regarding whether the resource user can access resource A (Refer to step 2). However, in step 3, owner A's PDU 614 is unable to make a decision. In some instances, resource A's PDU 614 may return a "no decision" response along with a PDU trust list (not shown) indicating other PDUs that it trusts. Because resource A's owner trusts owner B's PDUs 618, resource A's PEU 608 can access owner B's PDU 618 to request a resource access authorization decision (refer to step 4). Owner B's PDU 618 makes and returns a decision to resource A's PEU (refer to step 5). Also, from the PDU trust list, resource A's PEU can determine that there is a trust relationship between owner A's PDU and the platform. Therefore, in step 6, resource A's PEU 608 accesses the underlying platform's PDU 610 and requests a policy check. The platform's PDU 610 makes a decision regarding whether the user can access the protected resource A and returns this decision to resource A's PEU 608 (refer to step 7). In step 8, resource A's PEU 608 enforces the policy decision. Thus, although the policy decision made by a container's PDU is based on the information (e.g., policies, user information, etc.) provided to the container's PDU, the decision is enforced at the resources PEU (resource A's PEU).

A hierarchical PDU trust list allows the failover of policy decisions to the next best policy engine within the resource's trust hierarchy. In some instances, the decision made by the trusted container's PDU may not be the same as the decision made by the accessed resource's PDU. For example, in a virtual universe environment, a three-tier resource nesting could be represented as a chair (innermost resource) within a room within a building (outer resource)—a trust relationship existing between all three resources. A user may request permission to sit on the chair. The PDU associated with the chair may only include policies to determine whether the user is authorized allowed to sit on the chair, while the PDU associated with the room may determine whether the user is allowed to be in the room. Assuming that the user satisfies these conditions, the PDUs associated with the chair and the room may grant resource (chair) access to the user. When the PEU accesses the building's PDU, policies within the PDU may include checking the user's permissions and building conditions. For example, it may be determined that the building is on fire and is in evacuation mode. The building PDU may deny the user permission to sit on the chair, and insist that the user evacuate the building. Thus, different resources at different levels within the hierarchy can have different policies and may interpret user information differently to return different results. However, if trust exists between the PDUs, a better policy decision can be made, as opposed to unconditionally relying on or trusting the platform's PDU. In some instances, a policy decision may not be made at all levels of the resource hierarchy. For example, in FIG. 6, the resource's PEU 608 may not request a policy check of the underlying platform's PDU 610 if the resource owner does not trust the platform PDU. In some instances, the resource could be designed to not allow access if trusted PDUs are not available. In other instances, the resource PEU may request policy decisions of all trusted PDUs until a negative decision (e.g., user access is denied) is returned. In some instances, the resource PEU may request policies from all its trusted PDUs and enforce the majority decision (e.g., if two of three PDUs return an "allow access" decision, the PEU may allow a user to access the resource).

Embodiments may take the form of an entirely hardware embodiment, a software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium that can include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

CONCLUSION

While the embodiments are described with reference to various implementations and exploitations, it will be understood that these embodiments are illustrative and that the scope of the inventive subject matter is not limited to them. In general, techniques for user-centric policy architecture are described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned; and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for controlling access to resources of a virtual universe platform in a computer system, the method comprising:
    detecting a request to access a resource, wherein the resource resides in the computer system, and wherein the resource is associated with an owner;
    requesting a first resource access decision from a first policy decision unit associated with the owner;
    receiving, from the first policy decision unit, the first resource access decision and first trust information, wherein the first trust information indicates trust of a second policy decision unit;
    requesting a second resource access decision from the second policy decision unit associated with the virtual universe platform;
    receiving, from the second policy decision unit, a second resource access decision; and
    returning the second resource access decision.

2. The computer-implemented method of claim 1, wherein the platform is configured to present one or more virtual universes, wherein the resource resides in the computer system.

3. The computer-implemented method of claim 1, wherein the resource is any one of video files, audio files, documents, blogs, islands, buildings, media files, and presentations.

4. The computer-implemented method of claim 1, wherein the platform includes one or more of operating systems, virtual world applications, programming languages, and websites.

5. The computer-implemented method of claim 1, wherein the owner provided the resource for use on the platform, wherein the platform is configured to present a virtual universe, and wherein the resource is a virtual object in the virtual universe.

6. A computer-implemented method for controlling access to resources of a platform in a computer system, the method comprising:
    detecting a request to access a first resource in the computer system, wherein the first resource is associated with a second resource in the computer system, and wherein the first and second resources are associated with separate owners;
    requesting a first resource access decision from a first policy decision unit residing in the computer system, wherein the first policy decision unit is associated with the first resource's owner;
    receiving, from the first policy decision unit, a first trust information, wherein the first trust information indicates trust of a second policy decision unit associated with the second resource's owner, a third policy decision unit associated with the platform in the computer system, and a message indicating unavailability of the first resource access decision;
    requesting a second resource access decision from the second policy decision unit, wherein the second policy decision unit resides in the computer system;
    receiving, from the second policy decision unit, a second resource access decision;
    requesting a third resource access decision from a third policy decision unit, wherein the third policy decision unit resides in the computer system;
    receiving, from the third policy decision unit, a third resource access decision; and
    returning the third policy decision.

7. The computer-implemented method of claim 6, further comprising granting resource access to the first resource if two or more of the first, second, and third resource access decisions grant access to the first resource.

8. The computer-implemented method of claim 6, wherein the receiving the message indicating the unavailability of the first resource access decision indicates that a resource access decision is not requested from the second and third policy decision units and that access to the first resource is blocked.

9. The computer-implemented method of claim 6, wherein the resource access decisions are based on information including resource user name and id, resource user's position in an organization, accessed resource name and type, resource's security level, application name, and website's Internet Protocol (IP) address.

10. The computer-implemented method of claim 6, wherein the owner provided the resource for use on the platform, wherein the platform is configured to share media content over networks, and wherein the resource is a media file.

11. An apparatus for controlling access to resources of a platform in a computer system, the apparatus comprising:
    a platform configured to host one or more resources and run one or more applications;
    a policy decision unit (PDU) configured to store policies and determine access to the one or more resources;
    a policy enforcement unit (PEU) configured to detect a request to access a resource from the one or more resources, wherein the resource is associated with an owner;

request a first resource access decision from a first policy decision unit associated with the owner;

receive, from the first policy decision unit, the first resource access decision and first trust information, wherein the first trust information indicates trust of a second policy decision unit;

request a second resource access decision from the second policy decision unit associated with the platform;

receive, from the second policy decision unit, a second resource access decision; and return the second policy decision unit.

12. The apparatus of claim 11, wherein the platform is configured to host resources including any one or more of video files, audio files, documents, blogs, and virtual universe objects including islands, buildings, audio files, and presentations.

13. The apparatus of claim 11, wherein the platform is a framework on which resources are stored and software applications are run, and includes one or more of operating systems, virtual world systems, programming languages, and websites.

14. The apparatus of claim 11, wherein the owner provided the resource for use on the platform, wherein the platform is configured to present a virtual universe, and wherein the resource is a virtual object in the virtual universe.

15. The apparatus of claim 11, wherein the owner provided the resource for use on the platform, wherein the platform is configured to share media content over networks, and wherein the resource is a media file.

16. An apparatus also comprising:

a platform configured to host one or more resources and run one or more applications;

a policy decision unit (PDU) configured to store policies and determine access to the one or more resources;

a policy enforcement unit configured to detect a request to access a first resource, wherein the first resource is associated with a second resource, and wherein the first and second resources are associated with separate owners;

request a first resource access decision from a first policy decision unit associated with the first resource's owner;

receive, from the first policy decision unit, a first trust information, wherein the first trust information indicates trust of a second policy decision unit associated with the second resource's owner, a third policy decision unit associated with the platform, and a message indicating unavailability of the first resource access decision;

request a second resource access decision from the second policy decision unit;

receive, from the second policy decision unit, a second resource access decision;

request a third resource access decision from a third policy decision unit;

receive, from the third policy decision unit, a third resource access decision; and return the third policy decision unit.

17. The apparatus of claim 16 further comprising, the policy enforcement unit configured to grant resource access to the first resource if two or more of the first, second, and third resource access decisions grant access to the first resource.

18. The apparatus of claim 16, wherein the receiving a message indicating the unavailability of the first resource access decision indicates that a resource access decision is not requested from the second and third policy decision units and that access to the first resource is blocked.

19. The apparatus of claim 16, wherein the policy decision units are configured to determine the resource access decisions based on information including resource user name and id, resource user's position in an organization, accessed resource name and type, resource's security level, application name, and website's Internet Protocol (IP) address.

20. The apparatus of claim 16, wherein policy decision units are associated with a parameter, and wherein the parameter is used to specify the location of the policy decision unit in memory.

21. One or more machine-readable storage media having stored therein a program product, which when executed a set of one or more processor units causes the set of one or more processor units to perform operations that comprise:

detecting a request to access a resource of a platform, wherein the resource is associated with an owner;

requesting a first resource access decision from a first policy decision unit associated with the owner;

receiving, from the first policy decision unit, the first resource access decision and first trust information, wherein the first trust information indicates trust of a second policy decision unit;

requesting a second resource access decision from the second policy decision unit associated with the platform;

receiving, from the second policy decision unit, a second resource access decision; and returning the second policy decision unit.

22. The machine-readable storage media of claim 21, wherein the resource is any one of video files, audio files, documents, blogs, and virtual universe objects including islands, buildings, media files, and presentations.

23. The machine-readable storage media of claim 21, wherein the platform is a framework on which resources are stored and software applications are run, and includes one or more of operating systems, virtual world systems, programming languages, and websites.

24. The machine-readable storage media of claim 21, wherein the owner provided the resource for use on the platform, wherein the platform is configured to present a virtual universe, and wherein the resource is a virtual object in the virtual universe.

25. The machine-readable storage media of claim 21, wherein the owner provided the resource for use on the platform, wherein the platform is configured to share media content over networks, and wherein the resource is a media file.

* * * * *